United States Patent [19]

Zane et al.

[11] 4,436,232

[45] Mar. 13, 1984

[54] BRACKET FOR MOTORCYCLE LOCK

[75] Inventors: Peter L. Zane, S. Easton; Michael S. Zane, Cambridge, both of Mass.

[73] Assignee: KBL Corporation, Boston, Mass.

[21] Appl. No.: 297,240

[22] Filed: Nov. 16, 1981

[51] Int. Cl.³ .......................................... B62J 11/00
[52] U.S. Cl. ....................................... 224/39; 70/233; 248/503; 248/311.2; 280/289 L
[58] Field of Search ........................ 224/39, 40, 41, 42, 224/42.45 R, 904, 907, 30 R; 280/289 L; 70/233, 18; 248/74 R, 74 A, 74 B, 65, 503, 311.2, 310

[56] References Cited

U.S. PATENT DOCUMENTS

| | | | |
|---|---|---|---|
| 1,629,859 | 5/1927 | Burke | 224/30 R |
| 1,928,063 | 9/1933 | Lehmann | 224/907 X |
| 2,955,790 | 10/1960 | Sylvester | 248/65 |
| 3,100,590 | 8/1963 | Bohlsen | 224/904 X |
| 3,253,786 | 5/1966 | Parmelee | 248/74 R X |
| 3,263,948 | 8/1966 | Conrad | 248/74.3 |
| 3,401,857 | 9/1968 | Wilson et al. | 224/907 X |
| 3,967,475 | 7/1976 | Zane | 224/39 X |

Primary Examiner—Allan N. Shoap
Assistant Examiner—Robert Petrik
Attorney, Agent, or Firm—Morse, Altman & Dacey

[57] ABSTRACT

A bracket is provided for carrying and/or storing a large U-shaped lock used to secure a motorcycle or the like by passing the U-shaped shackle through the wheel of the bike and closing the ends of the shackle by means of a cross bar locked thereto. The bracket is comprised of a flat body portion along at least one edge of which is formed a tubular or semi-tubular receptacle adapted to receive a leg of the U-shaped lock shackle. Mounted to the body portion is a fastening device for engaging the cross bar of the lock to prevent longitudinal movement thereof with respect to the bracket. The bracket when used on a motorcycle preferably is mounted against the shock absorber for the rear wheel thereof.

13 Claims, 10 Drawing Figures

BRACKET FOR MOTORCYCLE LOCK

BACKGROUND OF THE INVENTION

1. Field of the Invention

This invention relates generally to brackets for storing locks and more particularly is directed towards a new and improved bracket for temporarily storing and/or carrying large U-shaped locks of the sort used on motorcycles and the like.

2. Description of the Prior Art

In order to reduce the incidence of theft of bicycles, mopeds, motorcycles and the like, locks of the sort shown in U.S. Pat. No. 4,155,231 have become increasingly more popular with the vehicle owners since such locks have proven to be very difficult to defeat by conventional means such as bolt cutters, hack saws, or the like. These locks are comprised of a U-shaped shackle of a hard metal rod and a cross-piece which locks to the ends of each leg of the shackle to allow the shackle to be passed through the wheel of the bicycle, moped, motorcycle, or the like, and secure the same to a fixed object such as a post, for example. While the smaller sized locks of this type that are used for bicycles can be readily and conveniently stored when not in use on a bracket of the sort as shown in U.S. Pat. No. 4,155,231, heretofore there has not been available a compact and efficient bracket suitable for storing and carrying the larger and heavier locks used for motorcycles.

Accordingly, it is an object of the present invention to provide an improved bracket for use in storing on a motorcycle or the like a large U-shaped lock with a detachable cross-piece.

Another object of this invention is to provide a bracket that is conveniently mountable on a motorcycle, or the like, at a location that does not interfere with the operation of the machine and which is both small and sturdy yet securely grips the lock during storage thereof.

SUMMARY OF THE INVENTION

This invention features a bracket for use on a motorcycle or the like for storing and carrying a lock having a U-shaped shackle and a cross bar lockably connected to the ends of the shackle. The bracket is comprised of a body portion generally dimensioned to fit between or around the legs of the shackle and adapted to be fastened to a part of the motorcycle, preferably to the bolt securing the upper end of the shock absorber to the frame with the body portion extending lengthwise along the shock absorber. At least one edge of the body portion is formed with a tubular or semi-tubular socket or receptacle to receive one leg of the shackle with clamping means on the body portion for securing the cross bar of the lock to the body portion. Multiple receptacles can be provided to accommodate different sizes of locks and a shock absorber-engaging clip may be provided on the inner side of the bracket to stabilize the bracket against the shock absorber.

DETAILED DESCRIPTION OF THE PREFERRED EMBODIMENTS

Figure 1:
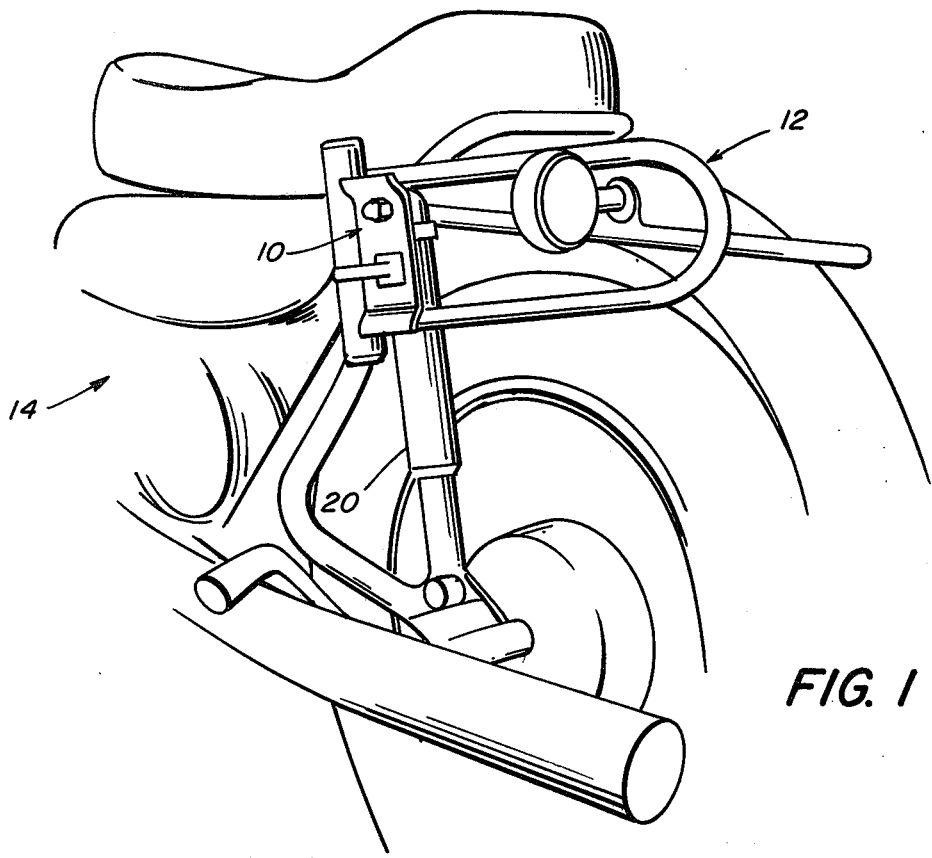
FIG. 1 is a view in perspective of a typical motorcycle to which is mounted a bracket made according to the invention and carrying a lock thereon.

Referring now to the drawings, the reference character 10 generally indicates a bracket for carrying a lock 12 of the sort used to secure a motorcycle 14 against theft. The lock shown in the illustrated embodiment is of the sort disclosed in U.S. Pat. No. 4,155,231 and is comprised of a U-shaped shackle 16 and a cross-piece 18 locked to the distal ends of the shackle. The shackle typically is fabricated from a hard steel rod bent into a U-shape and typically covered by a plastic sleeve to prevent damage to the finish of the motorcycle. The cross-piece is tubular and formed with a pair of openings to receive the ends of the legs, one leg being formed with a bent tip and the other leg end being notched to engage with a key-operated locking mechanisms within the cross-piece 18. The lock 12 is used typically by disengaging the cross-piece from the shackle and inserting the shackle legs through the spokes of the rear wheel and around at least one of the frames struts. This will prevent rotation of the wheel when the cross-piece is locked against the leg ends. The shackle can also be looped around a fixed object such as a parking meter, sign post, or the like to prevent the motorcycle from being carried away.

When the lock 12 is not being used to secure the motorcycle, it can be stored on the motorcycle by means of the bracket 10. In the preferred use of the bracket, it is mounted against a shock absorber 20, preferably the shock absorber on the left hand side of the rear wheel where the lock, when mounted to the bracket, will extend rearwardly in the manner illustrated. The bracket, in the preferred form of the invention, is comprised of unitary body portion 22 of generally rectangular outline and preferably is fabricated of aluminum by extrusion techniques although other suitable materials and manufacturing methods can be used to advantage. The body portion includes a flat medial web 24 which typically is about 2" wide and about 6" long although these dimensions can be varied according to the size of the lock with which it is to be used. The web should be relatively thick to provide structural strength and rigidity to the bracket and for aluminum a thickness of about ⅜" has been found satisfactory. Formed integral with the body portion is a pair of U-shaped channels 26 and 28 formed, respectively, along the upper and lower edges of the body portion, the channel 26 facing upwardly and the channel 28 facing downwardly. Each of the channels preferably is semi-cylindrical and of a radius of curvature such as to receive the legs of the shackle 16 neatly therein when the lock is stored on the bracket. The channels 26 and 28 preferably are formed on the front face of the body so that the rear face thereof remains substantially flat. This arrangement prevents either of the channels from interfering with any part of the motorcycle.

Figure 2:
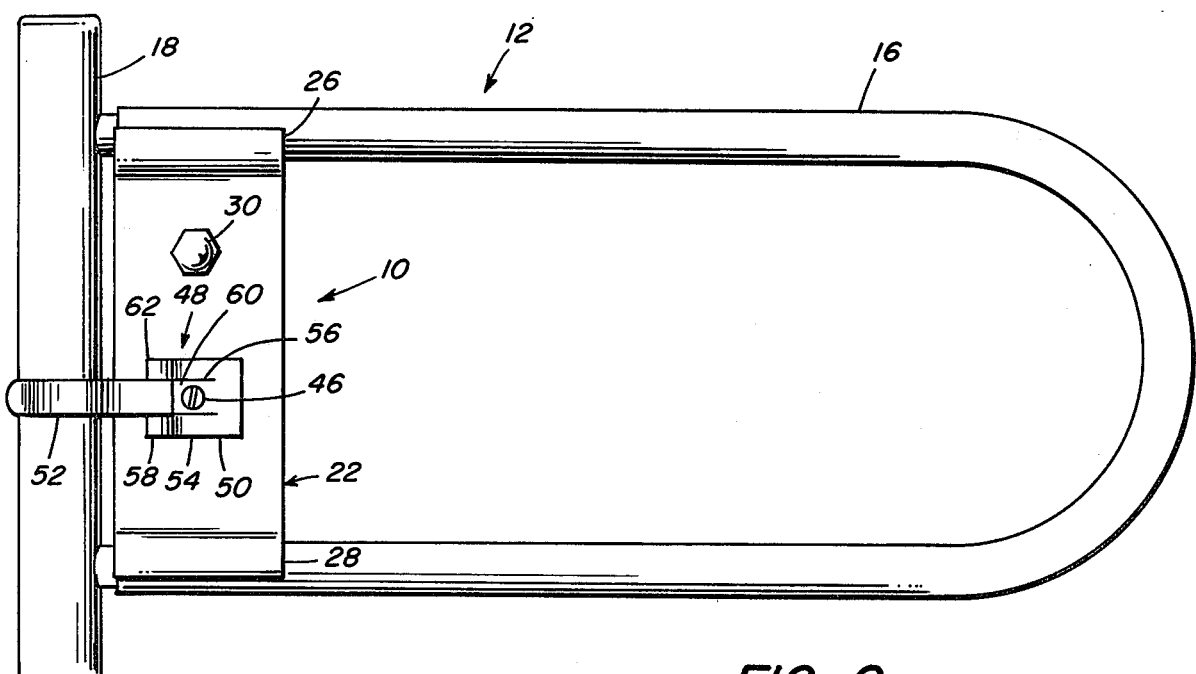
FIG. 2 is a view in side elevation of the bracket with a lock mounted thereon.
Figure 3:
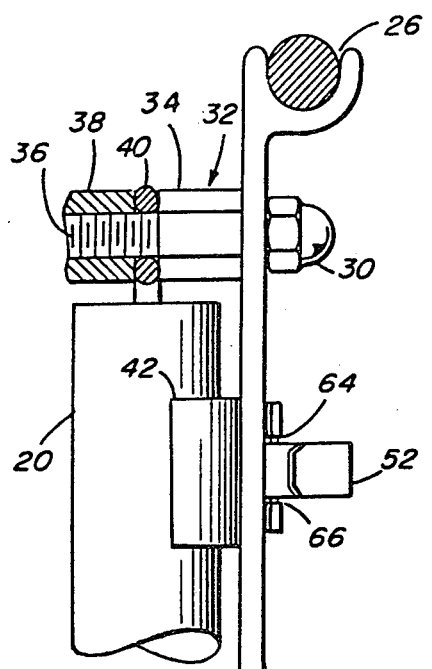
FIG. 3 is an end view thereof showing the lock in cross-section.

The bracket is mounted to the motorcycle against the shock absorber 20 by means of a nut 30 threaded onto the outer end of a connector 32 comprised of a nut portion 34 approximately ¾" long and a threaded stem passing through the body portion of the bracket and secured by the nut 30. The nut portion 34 is also formed with a tapped socket for joining the connector 32 to a bolt 36 secured to a mount 38 and passing through a ring 40 at the top of the shock absorber 20, as best shown in FIG. 3. In practice, the connector 32 is mounted to the bracket near the upper portion thereof close to the channel 26 as shown in FIG. 2.

Figure 8:
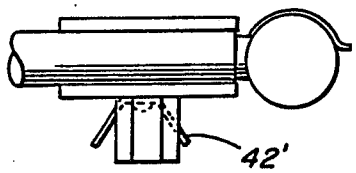
FIG. 8 is a view similar to FIG. 7 showing a modification of the stabilizer clip, and, FIGS. 9 and 10 are perspective views showing modifications of the invention.
Figure 7:
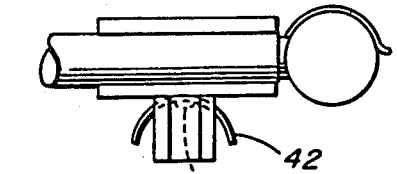
FIG. 7 is a detailed top plan view of the bracket showing the stabilizer clip.

Mounted below the nut 30 and connector 32 and on the inner face of the bracket body is a stabilizer 42 in the form of U-shaped member as shown in FIG. 7 with the axis thereof oriented lengthwise of the bracket and parallel to the axis of the shock absorber. The U-shaped stabilizer typically is about 1¼" long and has a radius of a curvature of about ¾" generally corresponding to the radius of curvature of the cylindrical shock absorber. The stabilizer is mounted to the bracket by any suitable means such as a nut 44 threaded onto the inner end of a bolt 46 passing through the body portion and generally aligned with the nut 30 as shown in FIG. 2. The function of the stabilizer is to bear against the side of the shock absorber in the manner suggested in FIG. 3 when the bracket is bolted in place. This prevents rotation of the bracket about the connector 32 and supports the lower part of the bracket against the side of the shock absorber. Instead of a U-shaped stabilizer such as shown in FIG. 7 a V-shaped stabilizer 42' may be used as shown in FIG. 8. The V-shaped stabilizer 42 is generally of the same size but by virtue of the configuration is more readily adaptable to shock absorbers of different diameters.

On the front face of the bracket and mounted thereto by means of a screw 46 is a clamping mechanism 48 comprised of a spring plate 50 and a C-shaped tongue 52. The plate is generally flat and rectangular and secured to the front face of the body portion 24 by means of the screw 46. The plate is formed with a pair of parallel slits 54 and 56 originating at the left hand edge of the plate 50 as viewed in FIG. 2 and extending about ⅝ to ¾ of the width of the plate to define three parallel fingers 58, 60 and 62. The center finger 60 is flat and underlies the flat inner end of the tongue 52. The outer fingers 58 and 62 are slightly arched at their outer ends transversely thereof, aligned with one another and in pressure engagement with a pair of outwardly extending flat tabs 64 and 66 formed integral with the inner end of the tongue 52. The plate preferably is of a somewhat spring-like material such as spring steel, for example, and maintains a pressure against the tabs 64 and 66 urging the tongue into the closed position shown with the curved portion of the tongue hooked over the shank of the cross-piece 18. In this position the lock 12 is securely held in the bracket and cannot slide either to the right or to the left within the channels 26 and 28. The lock can be released by flipping the tongue out and away from the cross-piece 18 against the pressure of the spring plate. The cross-piece 18 can then be unlocked and separated from the shackle 16 which then may be slipped to the right to fully disengage the bracket. The lock can be remounted by reversing this procedure.

Figure 5:
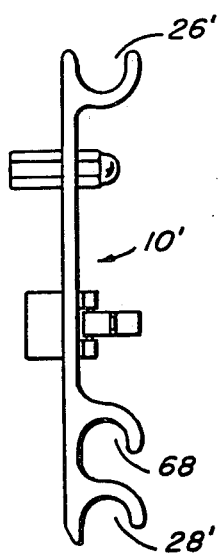
FIG. 5 is view similar to FIG. 4 but showing a modification of the invention.
Figure 4:
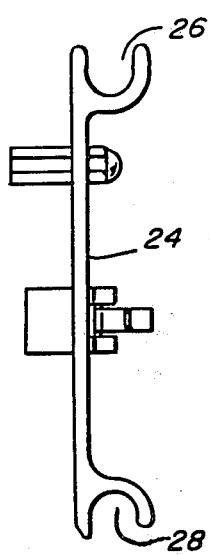
FIG. 4 is an end elevation showing the bracket only.

Referring now to FIG. 5 of the drawings, there is illustrated a modification of the invention and in this embodiment a bracket 10' is formed with top and bottom shackle-engaging channels 26' and 28' an additional channel 68 spaced inboard of the lower channel 28' and facing in the same direction. The channel 68 increases the utility of the bracket by permitting the bracket to be used in connection with either a full size lock 12 or a smaller size lock 12 in which the shackle legs are spaced closer together than in the larger size lock. The bracket 10' may be used with either size lock and is otherwise similar to the bracket of the principal embodiment.

Figure 6:
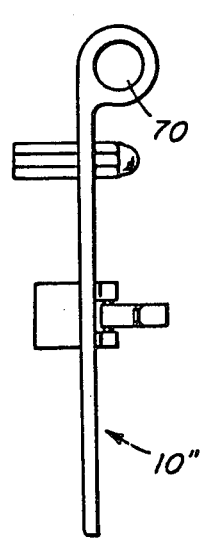
FIG. 6 is a view similar to FIG. 4 but showing another modification of the invention.

Referring now to FIG. 6 there is illustrated another modification of the invention and in this embodiment a bracket 10" is comprised of a flat, straight lower edge and a full tube 70 along the upper edge thereof. By using a full tube 70 along the upper edge in combination with the clamp 48 there is no need of a lower channel or tube and a wider variety of different sizes of locks can be mounted to the bracket since the full tube prevents lateral displacement of a lock mounted to the bracket and the clamp 48 prevents longitudinal movement. A lock secured to a bracket of the sort shown in FIG. 6 will be held firmly in place.

Figure 9:
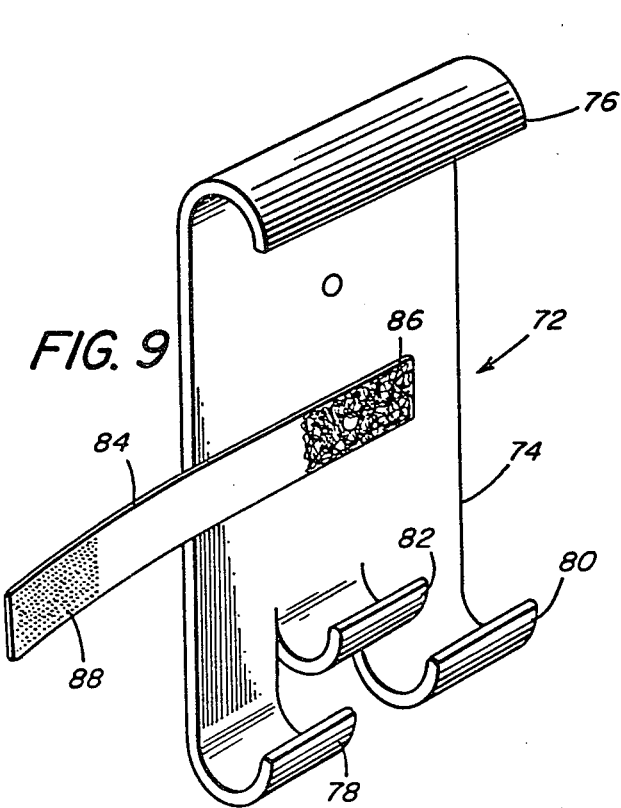

Referring now to FIG. 9 there is illustrated another modification of the invention, and in this embodiment a bracket 72 is comprised of a metal plate 74. Typically formed by stamping, and having a downwardly curved lip 76 along its upper edge to engage one leg of the shackle and a pair of upwardly curved tabs 78 and 80 along its lower edge to engage another leg of the shackle. A single center tab 82 is also provided between and above the tabs 78 and 80 to accommodate a smaller size lock. In this embodiment a strap 84 is provided to hold the cross-piece in place. The strap 84 is fastened at one end to the plate 72 and is provided with detachable fastening means such as the felt part 86 of a Velcro fastener. The free end of the strap is provided with the hooked part 88 of the fastener. In use the strap is simply wrapped about the cross-piece of the lock and the part 88 pressed against the part 86. Obviously, other fastening devices such as snap fasteners may also be used.

Figure 10:
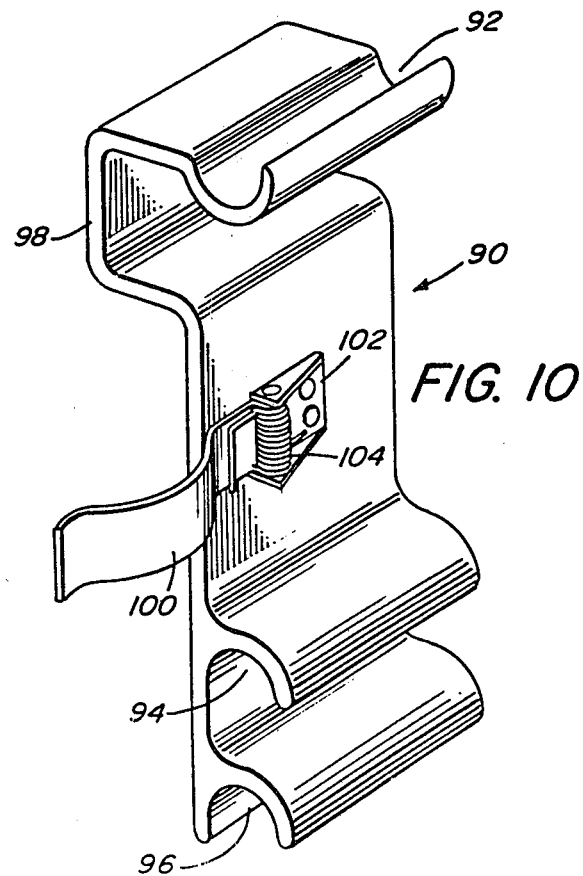

Referring now to FIG. 10 there is illustrated still another modification of the invention, and in this embodiment a bracket 90 is formed with a single upper channel 92 and a pair of lower channels 94 and 96 similar to the FIG. 5 embodiment. However, the FIG. 10 bracket includes a rearwardly extending offset portion 98 which allows for the elimination of the nut portion 34 in the principal embodiment. The FIG. 10 device also includes a spring loaded latch 100 hinged to a plate 102 fastened to the bracket body. A coil spring 104 urges the curved latch 100 into a closed position against the cross-piece of the lock.

The bracket, while primarily intended for use on motorcycles for mounting along side the shock absorber, may also be mounted to other parts of the motorcycle such as over the rear fender, for example, along the rear rack or, if the lock is to be used to secure a door in a building, the bracket could be located on a wall adjacent to the door or other convenient location to allow the bracket to hold the lock while it is not being used.

While the invention has been described with particular reference to the illustrated embodiments, numerous modifications thereto will appear to those skilled in the art. For example, magnetic elements may be employed to engage the cross-piece and prevent movement of the lock with respect to the bracket.

Having thus described the invention, what we claim and desire to obtain by Letters Patent of the United States is:

1. A bracket mountable to a support for holding a lock having a U-shaped shackle and a cross-piece adapted to be locked perpendicularly across the legs of said shackle, said bracket comprising
    (a) a rigid body portion dimensioned to generally span at least between the legs of said shackle,
    (b) said body portion being formed with at least one channel extending along an edge thereof and adapted to receive a leg of said shackle,
    (c) clamp means mounted to said body portion and adapted to engage said cross-piece to prevent movement of said leg along said channel,
    (d) mounting means operatively associated with said bracket for mounting said bracket to said support.

2. A bracket according to claim 1 wherein said channel is in the form of a channel of generally U-shape in cross-section.

3. A bracket according to claim 1 wherein said channel is in the form of a tube.

4. A bracket according to claim 1 said body portion includes a pair of channels in spaced parallel relation to one another, each of said channels adapted to receive a leg of said shackle.

5. A bracket according to claim 4 wherein said channels face oppositely away from one another.

6. A bracket according to claim 4 wherein said body portion includes a third receptacle between said pair of receptacles whereby locks of different sizes can be mounted to said bracket using a selected pair of said receptacles.

7. A bracket according to claim 1 wherein said clamp means includes a C-shaped tongue pivotally mounted to said body portion for movement in and out of engagement with said cross-piece and spring means connected between said tongue and said body portion for urging said tongue into engagement with said cross-piece.

8. A bracket according to claim 7 wherein said spring means includes a resilient plate fastened to said body portion and formed with a pair of arched parallel fingers, said tongue being formed with a pair of tabs at the hinged end thereof mounted between said fingers and in pressure engagement therewith.

9. A bracket according to claim 1 including a channel member mounted to the inner face of said body portion and adapted to engage a relatively fixed part of said support for stabilizing said bracket.

10. A bracket according to claim 1 wherein said mounting means includes a connector bolted to said body portion and extending from the inner face thereof.

11. A bracket according to claim 4 wherein said channels face towards one another.

12. A bracket according to claim 1 wherein said clamp means includes a strap fastened at one end to said body portion and cooperating fastening means at each end of said strap for securing the ends thereof together.

13. A bracket according to claim 1 wherein said body portion is formed with a rearwardly extending offset portion below the uppermost edge thereof.

* * * * *